(12) United States Patent
Takano et al.

(10) Patent No.: US 6,554,736 B2
(45) Date of Patent: Apr. 29, 2003

(54) HYBRID VEHICLE CONTROL DEVICE

(75) Inventors: Mikihiro Takano, Wako (JP); Naohisa Morishita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 4 days.

(21) Appl. No.: 09/758,428

(22) Filed: Jan. 12, 2001

(65) Prior Publication Data
US 2001/0010027 A1 Jul. 26, 2001

(30) Foreign Application Priority Data

Jan. 25, 2000 (JP) .................................... 2000-015437

(51) Int. Cl.$^7$ ............................................. B60K 41/02
(52) U.S. Cl. ........................................ 477/5; 477/906
(58) Field of Search .................... 477/5, 906; 180/65.2, 180/65.6, 65.7; 192/3.58

(56) References Cited

U.S. PATENT DOCUMENTS

| | | | |
|---|---|---|---|
| 5,873,426 A | * 2/1999 | Tabata et al. | 180/65.7 |
| 6,007,443 A | * 12/1999 | Onimaru et al. | 475/5 |
| 6,098,733 A | * 8/2000 | Ibaraki et al. | 180/65.2 |
| 6,123,163 A | * 9/2000 | Otsu et al. | 180/65.8 |
| 6,251,037 B1 | * 6/2001 | Baumgaertner et al. | 475/5 |
| 6,321,150 B1 | * 11/2001 | Nitta | 701/29 |
| 6,346,062 B1 | * 2/2002 | Shimabukuro et al. | 477/5 |

FOREIGN PATENT DOCUMENTS

JP 11-132321 5/1999

* cited by examiner

Primary Examiner—Jack Lavinder
Assistant Examiner—Thomas J. Williams
(74) Attorney, Agent, or Firm—Armstrong, Westerman & Hattori, LLP

(57) ABSTRACT

In a hybrid vehicle that is capable both of performing running drive with gear-change being effected by an infinitely variable gear-change mechanism that performs gear-change of the output rotation of an engine that is capable of temporary stoppage control and also of performing running drive by means of a second motor generator, when running using the second motor generator with the engine temporarily stopped, a forward/reverse changeover mechanism is released by a forward/reverse clutch control valve. If this forward/reverse clutch control valve becomes inoperable due to its spool sticking, etc., a gear shift inhibitor valve is operated by a gear shift control valve to supply line pressure to the forward/reverse changeover mechanism through a port of the forward/reverse clutch control valve in this sticking condition, so that this can thereby be engaged.

3 Claims, 8 Drawing Sheets

HYBRID VEHICLE CONTROL DEVICE

BACKGROUND OF THE INVENTION

1. Field of the Invention

The present invention relates to a hybrid vehicle constructed so that running drive can be effected by transmitting engine output through a gear-change mechanism to the vehicle and running drive is also possible by means of a drive motor that is arranged in parallel with the engine, so that, in prescribed operating conditions, the engine may be temporarily stopped and running drive may be performed by driving the vehicle by means of the drive motor.

2. Description of the Related Art

Efforts are being made to put into practice hybrid vehicles wherein running can be performed using engine drive and electric motor drive in combination, with the object of improving engine fuel consumption, etc. Such a hybrid vehicle is disclosed for example in Laid-open Japanese Patent Application Number H.11-132321. This vehicle comprises an engine, a first motor generator connected to the engine crankshaft, a belt type infinitely variable gear-change mechanism connected to the engine output shaft through a torque converter, and a second motor generator connected to a power transmission system on the output side of this infinitely variable gear-change mechanism. This vehicle is arranged such that ordinary running is performed by converting the gear ratio of the engine driving force in the infinitely variable gear-change mechanism before transmitting it to the vehicle wheels; when the vehicle is temporarily stopped, the engine is also temporarily stopped; and when subsequently the vehicle is made to move off, the vehicle wheels are driven by a second motor generator. It should be noted that, when the vehicle is thus made to move off again, the engine is restarted by the first motor generator, and after the vehicle has moved off a changeover is effected to running using engine drive.

If the engine is thus stopped when the vehicle is temporarily stopped, hydraulic pump drive by the engine is also stopped, causing the hydraulic pressure of the infinitely variable gearchange mechanism to be lost. Accordingly, a second hydraulic pump is provided that is driven by an electric motor and when the engine is stopped a prescribed hydraulic pressure is generated by driving the second hydraulic pump by means of this electric motor so as to prepare for the next move-off in a condition with the gear ratio set to the maximum (LOW) to enable motive force transmission, by supplying this prescribed hydraulic pressure to the output pulley cylinder chamber of the infinitely variable gear-change mechanism. In this way, in a hybrid vehicle as described above, an improvement is sought to be achieved with respect to fuel costs by stopping the engine when the vehicle is temporarily stopped, and an improvement with respect to fuel costs is sought to be achieved by driving the vehicle wheels using the second motor generator when moving off.

Consideration has also been given, with the object of further improving the fuel consumption, to stopping the engine and performing running using the electric motor drive also when the vehicle is running at comparatively high speed. If, in this case, the conventional hybrid vehicle control described above is employed without modification, the following problems arise.

Conventionally, when the engine was stopped in a condition where the vehicle was temporarily stopped, it was arranged for the clutch, which is provided in the power transmission system, to be prepared for the next move-off by being in an engaged condition, by hydraulic fluid pressure supplied from the second hydraulic fluid pump during the engine stoppage. However, if the clutch is put in engaged condition when the engine is stopped during running, the problem arises that the gear-change mechanism and the torque converter are rotated by the driving force from the vehicle wheels, generating entrainment torque, necessitating additional driving torque from the electric motor, thereby lowering drive efficiency. This is the reason why the clutch is disengaged when running is performed by means of the electric motor drive with the engine stopped.

However, when the arrangement is made such that the clutch is disengaged while running is performed using the electric motor drive, that is, the clutch is engaged and disengaged during the running by the engine drive and during the running by the electric motor drive, respectively, problems will arise if the controllability of engaging and disengaging the clutch is lowered that the switching over can not be done at a required timing, or a shock is created during the switching over operation. For example, in a case when the clutch engagement/disengagement control is performed by the use of hydraulic pressure, such problems will arise if a control valve for control of hydraulic engagement/disengagement of the clutch deteriorates or causes malfunction.

Further, there will also be a problem that the clutch is left in its disengaged state and becomes unable to be engaged due to the malfunction of the control valve, and in such a case the running performance of the vehicle is deteriorated. For example, in a case of a clutch that is engaged/disengaged by hydraulic pressure, such problem will arise if the spool of a control valve that control supply of working hydraulic pressure to the clutch is fixed at the position to block the supply of working hydraulic pressure due to its sticking. If the clutch is left in the disengaged state in this way, the output of the activated engine can not be transferred to the vehicle wheels, whereby the vehicle will be forced to travel only with the electric motor drive, without the engine drive and can not obtain sufficient driving force.

SUMMARY OF THE INVENTION

An object of the present invention is to provide a hybrid vehicle control device of a construction wherein means for engagement/disengagement such as a clutch are engaged/disengaged during running using an electrically driven motor drive and running using engine drive, such that engagement of the means for engagement/disengagement can be effected even when abnormality (electrical malfunction, i.e., failure of the gear-change mechanism and/or malfunction of the control valve etc) of the means for controlling the engagement/disengagement action of the means for engagement/disengagement occurs, without being affected by such abnormality.

According to the present invention, there is provided a hybrid vehicle comprising: an engine capable of temporary stoppage control in a prescribed operating condition, a gear-change mechanism (for example infinitely variable gear-change mechanism 20) connected to the output shaft of this engine and whereby its output rotation is changed in gear ratio; a driving force transmission system (for example, idler shaft 31, final drive gear 32, final driven gear 33, differential mechanism 34, and axle shafts 35) that transmits the output of this gear-change mechanism to the driven wheels; an electrically driven motor (for example, second motor generator 50) capable of driving said driven wheels and connected to this driving force transmission system, and means for engagement/disengagement (for example forwards/reverse changeover mechanism 10) arranged in a path from the output shaft of said engine to said driving force transmission system and that perform engagement/ disengagement control, arranged such that running drive can be performed by transmission of the output of the engine to the driven wheels through the gear-change mechanism and power transmission system by engagement of the means for engagement/disengagement and running drive can be performed by transmission of driving force of the electrically driven motor to the driven wheels in a condition with the means for engagement/disengagement released. Furthermore, this control device comprises auxiliary means for engagement control that, when abnormality of the gearchange mechanism is detected, are capable of engaging the means for engagement/disengagement without being affected by this abnormality, and is such that, when, in a condition with the means for engagement/disengagement released, running drive is performed by transmitting the driving force of the electrically driven motor to the driven wheels, if abnormality is detected, the means for engagement/disengagement are engaged by the auxiliary means for engagement control and running is effected by driving the engine instead of the electric motor.

If a hybrid vehicle control device constructed in this way is employed, even if an abnormality is detected when running drive is performed by transmitting the driving force of the electrically driven motor to the driven wheels in a condition with the means for engagement/disengagement released, for example, control can be effected such as to engage/disengage the means for engagement/disengagement by using the auxiliary means for engagement control. Because the auxiliary means for engagement control constitute means capable of effecting engagement of the means for engagement/disengagement unaffected by abnormality, excellent and reliable engagement control of the means for engagement/disengagement can be performed by the auxiliary means for engagement control even if abnormality is detected during running, so, even when abnormality occurs, the means for engagement/disengagement can be engaged/ disengaged with good timing and in a smooth manner (without shock). Also, if an abnormality is detected in a condition in which running drive is being performed by the electrically driven motor in a condition with the means for engagement/disengagement released, a shift to running drive using the engine can be reliably achieved by engaging the means for engagement/disengagement by the auxiliary means for engagement control, stopping this drive by stopping supply of driving power to the electric motor, and driving the engine.

The means for engagement/disengagement may comprise a hydraulic pressure type means for engagement/ disengagement that perform engagement/disengagement control using hydraulic pressure force, and the auxiliary means for engagement control may comprise an engagement/disengagement control valve (for example, forwards/reverse clutch control valve 73) that controls hydraulic pressure supply and cut-off for engagement/ disengagement control of the hydraulic means for engagement/disengagement, and auxiliary means for supplying hydraulic pressure (for example shift inhibitor valve 77, shift control valve 66, auxiliary changeover valve 85, and auxiliary changeover solenoid valve 83) capable of supplying hydraulic pressure for engagement/ disengagement control to the means for engagement/ disengagement when supply of hydraulic pressure to the means for engagement/disengagement is cut off by this engagement/disengagement control valve. In this case, the arrangement is such that, if abnormality is detected in a condition with supply of hydraulic pressure to the means for engagement/disengagement cut off by the engagement/ disengagement control valve, supply of engagement/ disengagement control hydraulic pressure to the means for engagement/disengagement can be performed by the auxiliary means for supplying hydraulic pressure.

Using a control device of such a construction, even if, for example, an abnormality is detected in a condition with the means for an engagement/disengagement being released (disengaged) by cutting off supply of hydraulic pressure to the means for engagement/disengagement by the engagement/disengagement control valve, or in a condition with the means for engagement/disengagement that are supplied with hydraulic pressure being engaged, control whereby the means for engagement/disengagement are engaged/disengaged can be performed in excellent fashion by supplying engagement/disengagement control hydraulic pressure to the means for engagement/disengagement by the auxiliary means for supplying hydraulic pressure. Because the auxiliary means for supply of hydraulic pressure constitute means capable of supplying engagement control hydraulic pressure to the means for engagement/ disengagement is unaffected by an abnormality, excellent and reliable engagement control of the means for engagement/disengagement can be performed by the auxiliary means for supplying hydraulic pressure even if abnormality is detected during running, so, even when abnormality occurs, the means for engagement/disengagement can be engaged/disengaged with good timing and in a smooth manner (without shock). Consequently, even if, when running drive is being performed using the electrically driven motor in a condition with, for example, the engine temporarily stopped and the means for engagement/disengagement released by cutting off supply of the engagement/ disengagement control hydraulic pressure to the means for engagement/disengagement, an abnormality such as malfunction of the engagement/disengagement control valve occurs making it impossible to re-engage the means for engagement/disengagement, re-engagement of the means for engagement/disengagement can be achieved by supplying engagement/disengagement control hydraulic pressure to the means for engagement/disengagement by the auxiliary means for supplying hydraulic pressure, upon detection of this abnormality. As a result, the situation of engine drive becoming impossible due to malfunction of the engagement/ disengagement control valve is reliably prevented.

The auxiliary means for supplying hydraulic pressure may comprise: a first auxiliary changeover valve (for example, shift inhibitor valve 77) capable of changeover movement between a normal position in which normal control hydraulic pressure is supplied to the means for gear-change control of said gear-change mechanism and a fail position in which fail control pressure is supplied, and first auxiliary means for operation control (for example, shift control valve 66) that performs position changeover operation control of this first auxiliary changeover valve. In this case, the first auxiliary changeover valve is provided with a port that communicates with the means for engagement/disengagement through the engagement/disengagement control valve when the engagement/disengagement control valve is in a condition cutting off supply of hydraulic pressure to the means for engagement/disengagement, where this port communicates with the drain when the first auxiliary changeover valve is in the normal position and communicating with an engagement/disengagement control hydraulic pressure supply source when it is in the fail position, and is arranged such that, under normal conditions, the first auxiliary means for operation control positions the first auxiliary changeover valve in the normal position and, if abnormality is detected, the first auxiliary means for operation control positions the first auxiliary changeover valve in the fail position.

If a control device constructed in this way is employed, even if, for example, when running drive is being performed using the electrically driven motor in a condition with the engine temporarily stopped and the means for engagement/disengagement released by cutting off supply of the engagement/disengagement control hydraulic pressure to the means for engagement/disengagement, an abnormality such as malfunction of the engagement/disengagement control valve occurs making it impossible to re-engage the means for engagement/disengagement, control to engage the means for engagement/disengagement can be achieved by supplying engagement/disengagement control hydraulic pressure to the means for engagement/disengagement through the aforesaid port from the engagement/disengagement control hydraulic pressure supply source by the first auxiliary means for operation control positioning that first auxiliary changeover valve in the fail position on detection of this abnormality. Consequently, even when an abnormality occurs, control can be exercised such that the means for engagement/disengagement are engaged/disengaged with suitable timing and in a smooth manner, so the situation of engine drive becoming impossible can be reliably prevented.

Also, the auxiliary means for supplying hydraulic pressure may comprise: a second auxiliary changeover valve (for example auxiliary changeover valve 85) comprising a port that communicates with the means for engagement/disengagement through the engagement/disengagement control valve when the engagement/disengagement control valve is in a condition cutting off supply of hydraulic pressure to the means for engagement/disengagement, and second auxiliary means for operation control (for example, auxiliary changeover solenoid valve 83) that cause changeover movement between a drain position in which the port communicates with the drain and a supply position in which said port communicates with an engagement/disengagement control hydraulic pressure supply source, by performing operation control of the second auxiliary changeover valve. In this case, under normal conditions, the second auxiliary means for operation control positions the second auxiliary changeover valve in the drain position and, if abnormality is detected, the second auxiliary means for operation control positions the second auxiliary changeover valve in the supply position.

Thus, if a control device of such construction is employed, if, when running drive is being performed using the electrically driven motor in a condition where the means for engagement/disengagement is released, an abnormality such as malfunction of the engagement/disengagement control valve occurs making it impossible to re-engage the means for engagement/disengagement, engagement of the means for engagement/disengagement can be achieved by supplying engagement/disengagement control hydraulic pressure through the aforesaid port from the engagement/disengagement control hydraulic pressure supply source to the means for engagement/disengagement by the second auxiliary means for operating control positioning the second auxiliary changeover valve in the supply position. As a result, the situation of engine drive becoming impossible due to malfunction of the means for engagement/disengagement can be reliably prevented with this control device.

Further applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
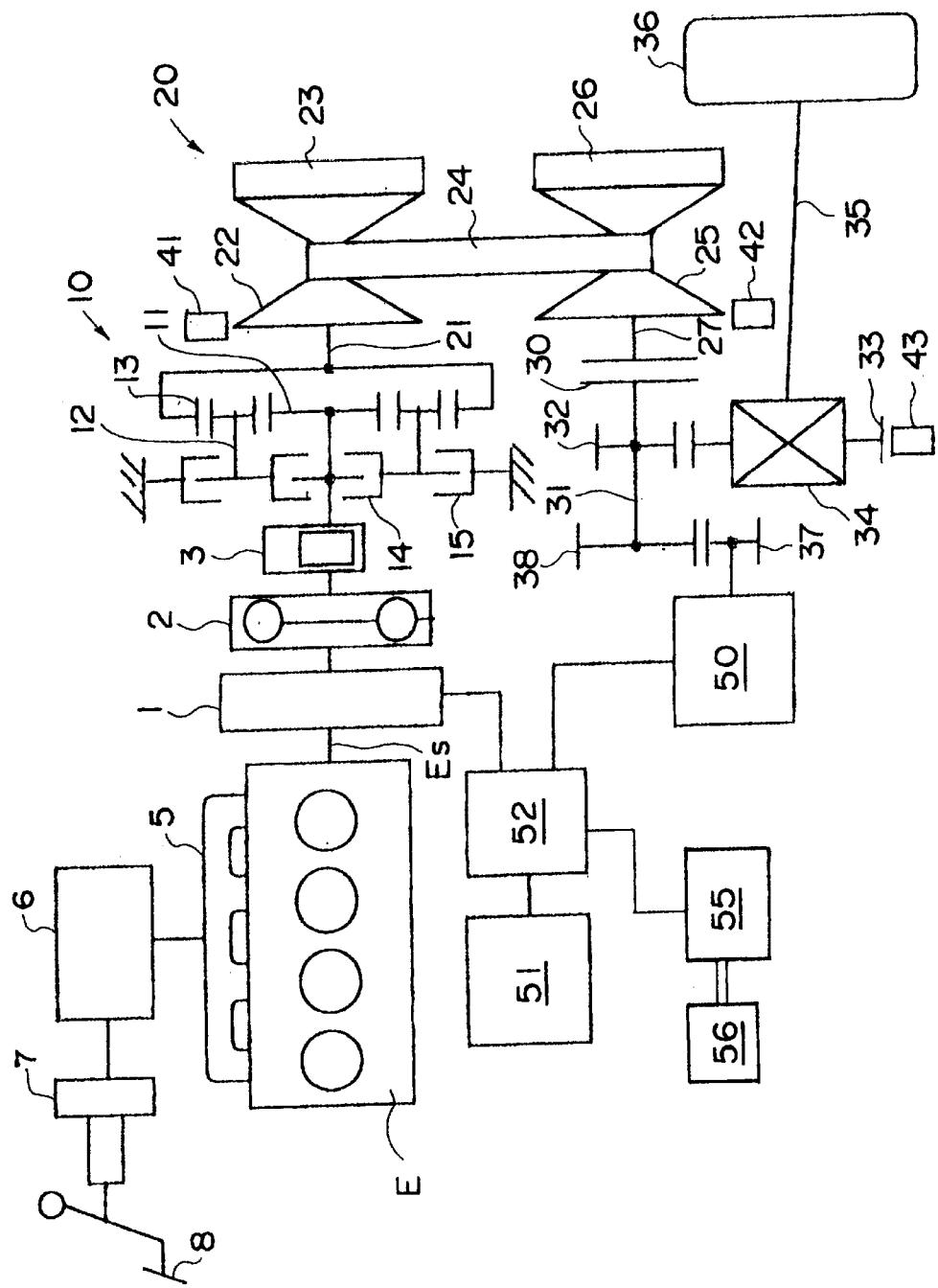
FIG. 1 is a schematic diagram illustrating the layout of the power transmission device of a hybrid vehicle equipped with a control device according to the present invention.

Preferred embodiments of the present invention are described below with reference to the drawings. FIG. 1 shows the layout of a power transmission device for a hybrid vehicle provided with a control device according to the present invention. This power transmission device is employed for ordinary running drive and is provided with an engine E capable of temporary stoppage control. A vacuum tank 6 is provided that accumulates negative pressure by extracting negative pressure from suction pipe 5 of this engine E; the negative pressure of vacuum tank 6 is supplied to brake booster 8, multiplying the operating force of brake pedal 8 in performing brake operation.

The first motor generator 1 is provided on the output shaft Es of engine E. This first motor generator 1 performs starting drive of engine E and engine drive assistance, etc., when moving off, and also performs energy regeneration by being used as a generator during deceleration. The output shaft Es of engine E is coupled with forwards/reverse changeover mechanism 10 through a damper mechanism 2. A first hydraulic pump 3 is driven by engine E. This first hydraulic pump 3 being provided on this engine output shaft Es.

Forward/reverse changeover mechanism 10 comprises a single pinion type planetary gear having a sun gear 11 coupled with engine output shaft Es through dumper mechanism 2, a carrier 12 that freely rotatably supports the pinion gear arranged meshing therewith at the periphery of sun gear 11 and which is freely rotatably arranged coaxially with sun gear 11, and ring gear 13 that is freely rotatably arranged coaxially with sun gear 11, meshing with the pinion gear, and which is linked with the gear-change mechanism input shaft 21, and is further provided with a forward clutch 14 capable of connecting and disconnecting carrier 12 and sun gear 11 (or engine output shaft Es), and a reverse brake 15 capable of fixing and holding carrier 12. Consequently, when forward clutch 14 is engaged, the entire planetary gear performs the same rotation as engine output shaft Es, and gear-change mechanism input shaft 21 is driven in rotation forward. On the other hand, when reverse brake 15 is engaged, ring gear 13 is rotated in the opposite direction with respect to engine output shaft Es, causing gear-change mechanism input shaft 21 to be rotated in the vehicle reversing direction. It should be noted that if forward clutch 14 and reverse brake 15 are both released, engine output shaft Es and gear-change mechanism input shaft 21 are disconnected.

A metal V belt type infinitely variable gear-change mechanism 20 is constructed having a gear-change mechanism input shaft 21. Rotation of gear-change mechanism input shaft 21 which is driven in rotation as described above is subjected to an infinitely variable change in gear ratio by infinitely variable gear-change mechanism 20 and transmitted to gear-change mechanism output shaft 27. Infinitely variable gear-change mechanism 20 comprises a drive pulley 22 whose pulley width is capable of being variably adjusted by means of drive-side hydraulic cylinder 23, driven pulley 25 whose pulley width is capable of being variably adjusted by means of driven-side hydraulic cylinder 26, and a metal V belt 24 that is provided between the two pulleys 22 and 25. Drive pulley 22 is connected to gear-change mechanism input shaft 21 and driven pulley 25 is connected to gear-change mechanism output shaft 27. Consequently, rotation of gear-change mechanism input shaft 21 can be transmitted to gear-change mechanism output shaft 27 with an infinitely variable gear ratio, by controlling the hydraulic pressure that is supplied to the drive and driven side hydraulic cylinders 23 and 26.

Moving-off clutch 30 is connected to gear-change mechanism output shaft 27. Moving-off clutch 30 comprises a clutch of the hydraulically actuated type and engagement control of moving-off clutch 30 is performed by control of the actuating hydraulic pressure. An idler shaft 31 that is coupled with a gear-change mechanism input shaft 27 through moving-off clutch 30 is freely rotatably arranged. A final drive gear 32 that is arranged coupled with idler shaft 31 meshes with a final driven gear 33 incorporating a differential mechanism 34. Differential mechanism 34 is coupled to the left and right vehicle wheels 36 through left and right axle shafts 34 (only the right hand ones are shown in the Figure).

A motor-side driven gear 38 is arranged coupled with idler shaft 31 and meshes with motor-side drive gear 37 which is arranged coupled with the rotary shaft of a second motor generator 50. Consequently, the left and right vehicle wheels 36 can be driven from idler shaft 31 by means of second motor generator 50 and, contrariwise, using this as a generator, energy regeneration can be performed by this being rotated by receiving drive force from vehicle wheels 36.

The first and second motor generators 1, 50 are connected to battery 51 through power drive unit 52. In this way, these motor generators 1, 50 can be driven by supplying power from battery 51, or the battery can be charged (i.e., energy regeneration performed) by the power obtained by making these motor generators 1, 50 act as generators when they are driven in rotation.

Also, an electric motor 55 for pump drive is connected to power drive unit 52 and a second hydraulic pump 56 is connected to the rotary drive shaft of this electric motor for pump drive 55. The second hydraulic pump 56 can therefore be driven by driving electric motor 55 for pump drive by the power from battery 51.

In the power transmission device constructed as above, the output of engine E or the output of first motor generator 1 is transmitted through forward/reverse changeover mechanism 10 to infinitely variable gear-change mechanism 20, where the transmission ratio is changed, after which transmission control is performed by moving-off clutch 30 and, further, is transmitted to the left and right vehicle wheels 36 through differential mechanism 34, etc. In this way, vehicle running drive is performed by engine E or first motor generator 1. When first motor generator 1 is driven in rotation by the vehicle wheels 36 as, for example, during decelerating running, this acts as a generator so that energy regeneration is thereby performed. On the other hand, the output of the second motor generator 50 is transmitted to the left and right vehicle wheels 36 through differential mechanism 34, etc., from idler shaft 31. In this case also, when the second motor generator 50 is driven in rotation by vehicle wheels 36, this acts as a generator so that energy regeneration is performed.

As will be clear from the above construction, in running drive control, engagement control of the forward clutch 14 and reverse brake 15, gear-change control performed by pulley width adjustment of the drive and driven pulleys 22 and 25 by the drive side and driven-side hydraulic cylinders 23 and 26, and engagement control of the moving-off clutch 30 are required. In order to achieve such control, etc., there are provided a first rotation sensor 41 that detects rotation of the gear-change mechanism input shaft 21 (drive pulley 22), a second rotation sensor 42 that detects rotation of the gear-change mechanism output shaft 27 (driven pulley 25) and a third rotation sensor 43 that detects rotation (i.e., vehicle speed) of the final driven gear 33.

Figure 2:
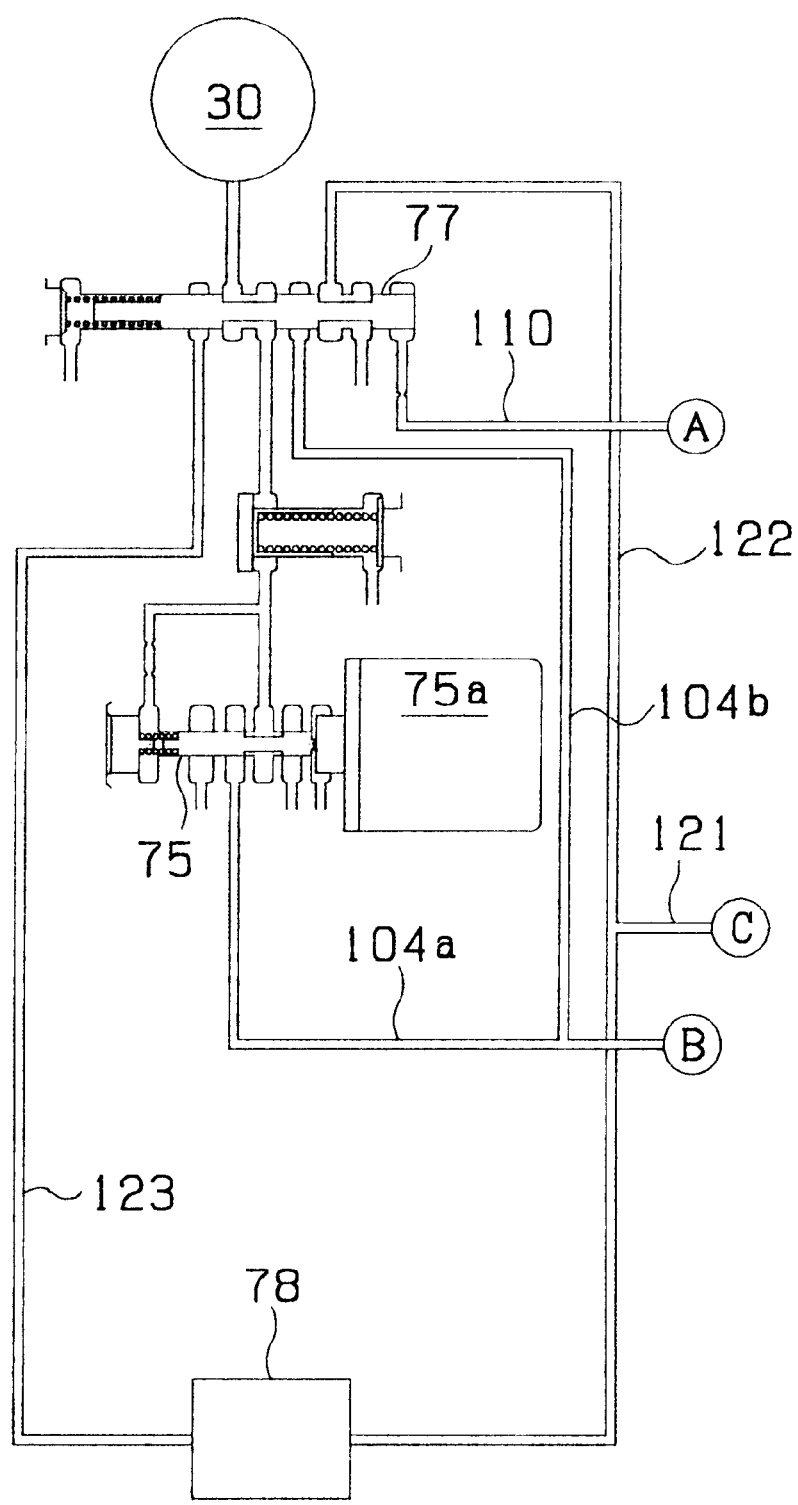
FIG. 2 to FIG. 4 are hydraulic circuit diagrams illustrating the layout of a control device according to a first embodiment of the present invention.
Figure 3:
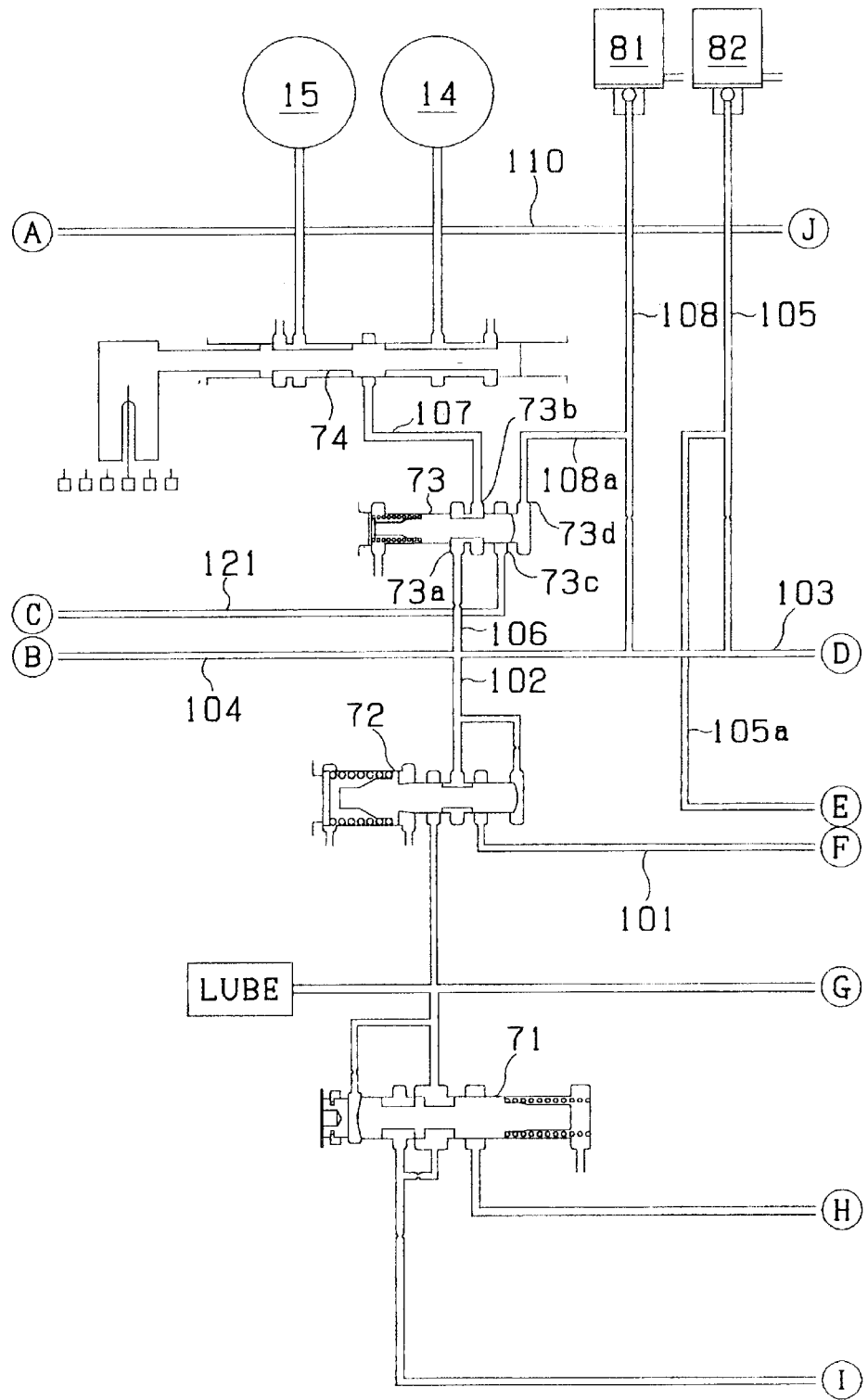
Figure 4:
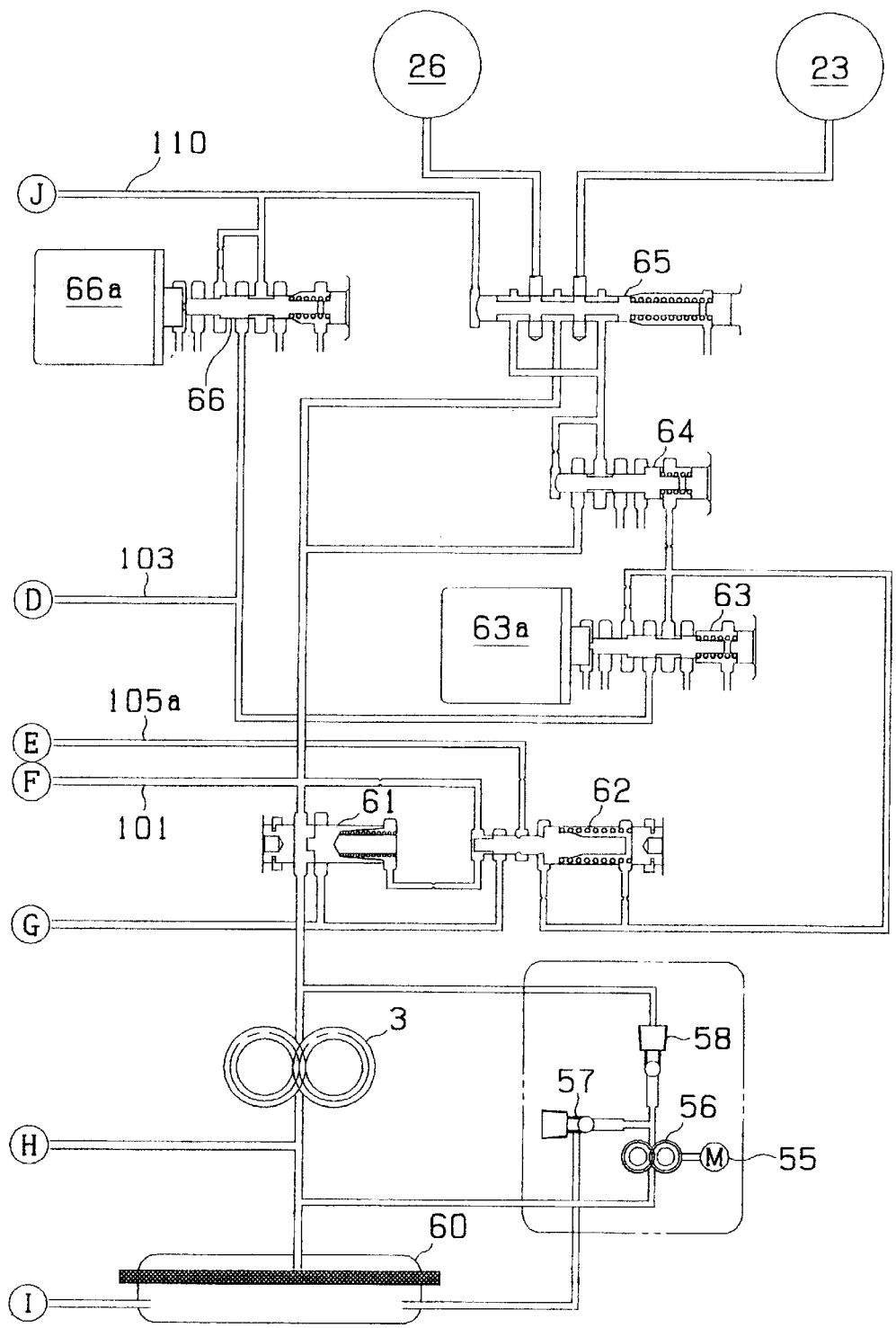
Figure 5:
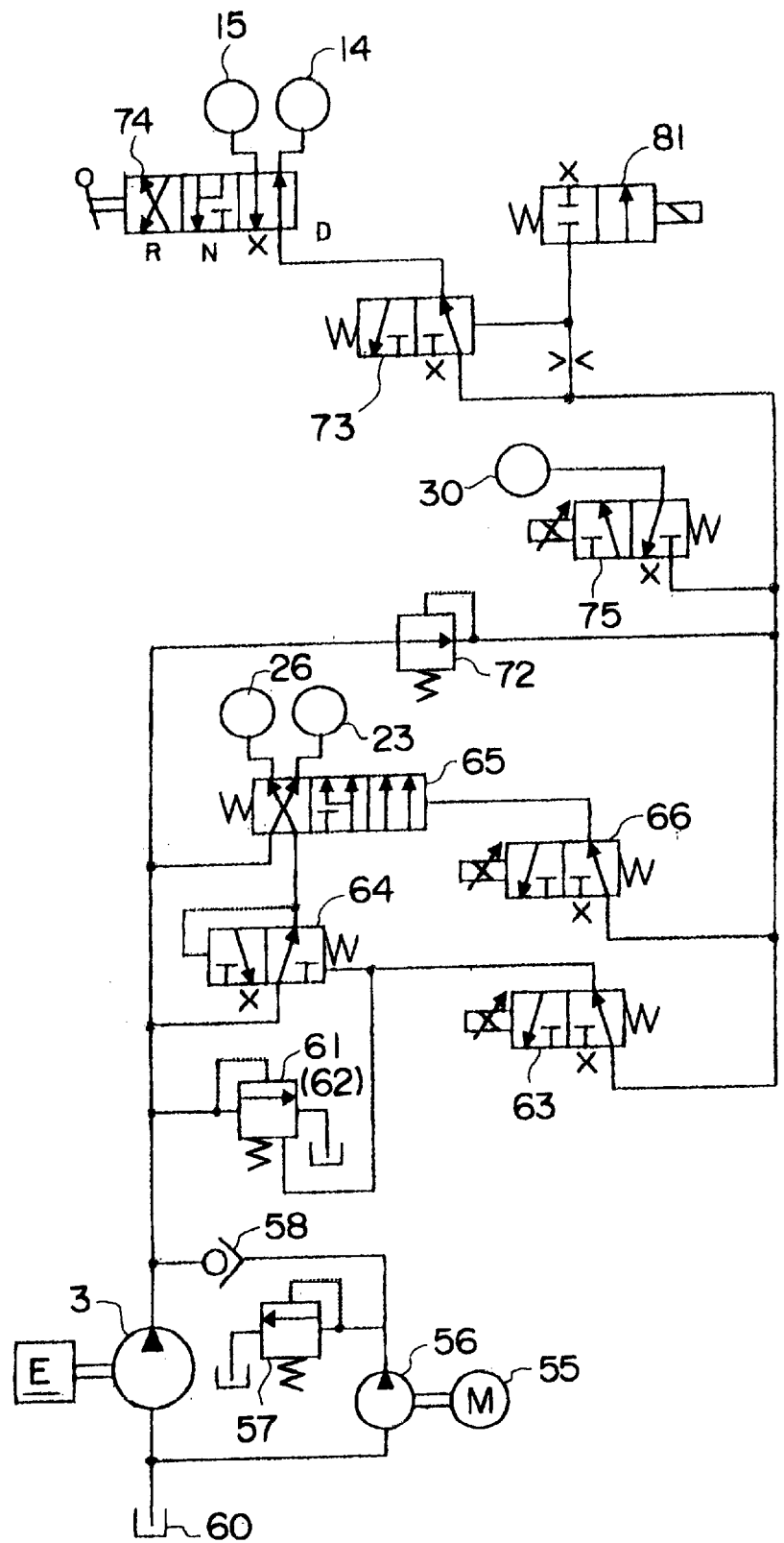
FIG. 5 is a schematic view of a hydraulic circuit illustrating the layout of a control device according to a first embodiment of the present invention.

These control actions are performed by using the hydraulic pressure supplied from first hydraulic pump 3 or second hydraulic pump 56. The construction of the hydraulic control device that performs these control actions is described below with reference to the hydraulic circuit diagrams of FIG. 2 to FIG. 4 and the hydraulic circuit schematic view of FIG. 5. In these Figures, the hydraulic circuits indicated by the circled letters of the alphabet A to I are mutually connected.

This hydraulic control device comprises a first hydraulic pump 3 and second hydraulic pump 56 that deliver working hydraulic fluid in oil tank 60 formed by the gear-change mechanism housing, etc. As described above, first hydraulic pump 3 is driven by engine E and second hydraulic pump 56 is driven by electric motor for pump drive 55. A relief valve 57 and one-way valve at 58 are provided on the discharge hydraulic fluid path of the second hydraulic pump 56 driven by electric motor for pump drive 55. A high hydraulic pressure for control purposes is created by adjusting the pressure of the hydraulic fluid discharged by the two hydraulic pumps 3, 56 by means of high pressure regulator valve 61, and this high hydraulic pressure for control purposes is supplied to a shift valve 65 and low-pressure regulator valve 64. A low hydraulic pressure for control purposes created by pressure adjustment by low-pressure regulator valve 64 is also supplied to shift valve 65.

High-pressure regulator valve 61 creates a high hydraulic pressure for control purposes in accordance with the back pressure from high-pressure control valve 62 and the operation of high-pressure control valve 62 and low-pressure regulator valve 64 is controlled by the hydraulic pressure for control purposes from high/low pressure control valve 63. High/low pressure control valve 63 creates an arbitrary hydraulic pressure for control purposes in accordance with the control current by means of linear solenoid 63a. As can be understood from this, a high hydraulic pressure for control purposes and a low hydraulic pressure for control purposes are set by signal current control of linear solenoid 63a of the high/low-pressure control valve 63.

Shift valve 65 supplies in distributed fashion high pressure hydraulic fluid for control purposes and low-pressure hydraulic fluid for control purposes supplied as described above to drive- and driven-side hydraulic cylinders 23 and 26 so as to effect gear ratio control by pulley width adjustment of the drive and driven pulleys 22 and 25. The operation of this shift valve 65 is controlled by shift control hydraulic pressure from a shift control valve 66 actuated by linear solenoid 66a. Specifically, gear ratio control can be performed by controlling the operation of shift valve 65 by performing signal current control of linear solenoid 66a.

The high hydraulic pressure for control purposes created by high pressure control valve 61 is supplied to clutch reducing valve 72 from hydraulic fluid path 101, creating line pressure, which line pressure is supplied to hydraulic fluid path 102. The excess hydraulic fluid that is evacuated from high-pressure regulator valve 61, high-pressure control valve 62, and clutch reducing valve 72 is adjusted in pressure by lubricating valve 71 and supplied to lubricating section LUBE. The line pressure of the hydraulic fluid path 102 is supplied from hydraulic fluid path 103 to high/low pressure control valve 63 and shift control valve 66 and furthermore is supplied from hydraulic fluid paths 104, 104a to a moving-off clutch control valve 75, to be described below.

The line pressure of hydraulic fluid path 102 is supplied through hydraulic fluid path 105 to high pressure control solenoid valve 82 and is supplied through hydraulic fluid path 105a to high pressure control valve 62. As a result, it is possible to change over the setting of the high-pressure hydraulic fluid for control purposes between two levels, by performing changeover control of supply of line pressure to the high pressure control valve 62 by using high-pressure control solenoid valve 82.

The line pressure of hydraulic fluid path 102 is further supplied from hydraulic fluid path 106 through forward/reverse clutch control valve 73 to hydraulic fluid path 107 and, furthermore, is arranged to be selectively supplied through manual valve 74 to forward clutch 14 and reverse brake 15. Forward/reverse clutch control valve 73, as shown in the Figure, is provided with four ports 73a to 73d, first port 73a being connected to hydraulic fluid path 106, second port 73b being connected to hydraulic fluid path 107, third port 73c being connected to hydraulic fluid path 121, and fourth port 73d being connected to hydraulic fluid path 108a.

In the forward/reverse clutch control valve 73, when line pressure is received from hydraulic path 108a at the right-hand end thereof, the spool is moved leftwards as shown in the Figure, causing first and second ports 73a, 73b to be put in communication through the spool groove, allowing communication of hydraulic fluid path 106 and hydraulic fluid path 107, and simultaneously blocking the third port 73c by means of the spool land, thereby cutting off hydraulic fluid path 121 at this point. On the other hand, when the line pressure from hydraulic fluid path 108a disappears, the spool is moved to the right by the spring force, causing the first port 73a to be blocked by the spool land, cutting off the hydraulic fluid path 106 at this point, and allowing communication of the second and third ports 73b, 73c, causing the hydraulic fluid path 107 to be put in communication with the hydraulic fluid path 121. The action of the line pressure on the hydraulic fluid path 108a is controlled by the forward/reverse clutch control solenoid valve 81, which is connected from hydraulic fluid path 102 through hydraulic fluid path 108.

As can be seen from the above construction, the action of the forward/reverse clutch control valve 73 is controlled by forward/reverse clutch control solenoid valve 81, so that control is effected whereby line pressure is supplied to forwards clutch 14 and reverse brake 15 through manual valve 74, or supply thereof is cut off. That is, this control is control that is performed under normal conditions. If abnormality occurs, as will be described, line pressure supply control from hydraulic fluid path 121 is performed.

Manual valve 74 performs a changeover action in response to operation of the gear shift lever at the driver's seat whereby it blocks hydraulic fluid path 107 in ranges P and N and connects both the forward clutch 14 and reverse brake 15 to the drain, thereby releasing the forward clutch 14 and reverse brake 15. In range R, it connects reverse brake 15 with the hydraulic fluid path 107, so that line pressure is supplied to the reverse brake 15, which can thereby be engaged. In the forward drive ranges, i.e., D, S, and L ranges, it connects hydraulic fluid path 107 with forward clutch 14, causing line pressure to be supplied to the forward clutch 14, which can thereby be engaged.

When hydraulic fluid path 106 and hydraulic fluid path 107 are in a connected condition due to receipt of line pressure from hydraulic fluid path 108a at the right-hand end of forwards/reverse clutch control valve 73, engagement operation of forwards/reverse clutch 14 or reverse brake 15 is possible, as described above. However, if no line pressure is acting on hydraulic fluid path 108a, in the normal condition, hydraulic fluid path 107 is connected to the drain by forward/reverse clutch control valve 73 through hydraulic path 121, with the result that forward clutch 14 and reverse brake 15 are released irrespective of the position into which the manual valve 74 has been moved. In the case of abnormality, line pressure supply control is performed through hydraulic path 121, as will be described later.

As described above, the operation of moving-off clutch control valve 75 that is supplied with line pressure through hydraulic fluid paths 104, 104a is controlled by linear solenoid 75a, causing moving-off clutch control hydraulic pressure to be supplied to moving-off clutch 30 through shift inhibitor valve 77, thereby performing engagement control of moving-off clutch 30. The right-hand end of shift inhibitor valve 77 is connected to shift control valve 66 through hydraulic pressure path 110. If, for example, abnormality of the device occurs or supply of drive power disappears, the current passing through linear solenoid 66a of shift control valve 66 becomes zero, causing the shift control hydraulic pressure that is supplied to hydraulic fluid path 110 to be made the maximum.

When this maximum control hydraulic pressure is supplied to shift inhibitor valve 77 through hydraulic fluid path 110, its spool is shifted to the left, causing supply of control hydraulic pressure from moving-off clutch control valve 75 to be cut off, with the result that the hydraulic fluid path 104b that is branched from hydraulic fluid path 104 is put in communication with hydraulic fluid path 122, allowing line pressure to be supplied to Pitot control valve 78. Also, in the condition with the spool of a shift inhibitor valve 77 moved to the left, hydraulic fluid path 123 whereby the Pitot pressure from Pitot control valve 78 is output is connected to moving-off clutch 30. As a result, in this case, the Pitot pressure from Pitot control valve 78 is supplied to moving-off clutch 30 instead of the control hydraulic pressure from moving-off clutch control valve 75. That is, in the event of abnormality, etc., it can be arranged for engagement control of moving-off clutch 30 to be performed using the Pitot pressure.

This maximum control hydraulic pressure is also supplied to shift valve 65, causing its spool to be shifted to the right, so that high hydraulic pressure for control purposes is supplied to driven-side hydraulic pressure cylinder 26, and low hydraulic pressure for control purposes is supplied to drive-side hydraulic pressure cylinder 23, causing the gear ratio to be made LOW.

Also, hydraulic fluid path 121 is branched from hydraulic fluid path 122 and, as described above, hydraulic fluid path 121 is connected with third port 73c of forward/reverse clutch control valve 73. Consequently, when, under abnormal conditions, etc., as described above, the spool of shift inhibitor valve 77 is moved to the left, line pressure is supplied from hydraulic fluid path 104b to hydraulic fluid path 122, whereupon line pressure is supplied to third port 73c of forward/reverse clutch control valve 73 through hydraulic fluid path 121. It should be noted that, when the spool of shift inhibitor valve 77 is moved to the right under normal conditions, as can be seen from FIG. 2, hydraulic fluid path 122 is put in communication with the drain, thereby allowing hydraulic fluid path 121 also to communicate with the drain.

As described above, when the spool of the forward/reverse clutch control valve 73 is moved to the right by means of forward/reverse clutch control solenoid valve 81, the second and third ports 73b and 73c are put in communication, thereby allowing communication of hydraulic fluid path 107 and hydraulic fluid path 121. As a result, although, under normal conditions, hydraulic fluid path 107 communicates with the drain, in the event of abnormality, etc., the spool of shift inhibitor valve 77 is moved leftwards, whereupon the line pressure passes through hydraulic fluid paths 121, 107 and, further, through manual valve 74 and is supplied to forwards clutch 14 or reverse brake 15. As can be seen from this fact, the shift inhibitor valve 77 corresponds to a first auxiliary changeover valve, the rightwardly moved position of its spool being the ordinary position, while the leftwardly moved position is the fail position. The line pressure that is supplied to hydraulic fluid path 121 by leftwards movement of the spool is the fail control hydraulic pressure. Also, shift control valve 66 corresponds to the first auxiliary operation control means.

Next, the various control operations in a power transmission device for a hybrid vehicle constructed as above will be described. In this power transmission device, basically, the driving force of engine E is changed in transmission ratio by means of forwards/reverse changeover mechanism 10 and infinitely variable gear-change mechanism 20 and effects running drive by being transmitted from moving-off clutch 30 to the vehicle wheels through final drive and driven gears 32 and 33, differential mechanism 34, and axle shafts 35, etc. That is, vehicle running is performed by drive of engine E. When moving off, drive assistance is effected by means of first motor generator 1 and during deceleration energy regeneration is performed (battery 51 is charged) by operating first motor generator 1 as a generator.

When the vehicle is stationary or in a condition in which the vehicle is running at comparatively high speed, control is effected to temporarily stop the engine E with the aim of improving fuel consumption. When the engine is thus temporarily stopped during vehicle running, control is exercised to continue running by driving vehicle wheels 36 by driving second motor generator 50. When this happens, generation of entrainment torque on the engine side from forward/reverse changeover mechanism 10 is prevented by releasing both forwards clutch 14 and reverse brake 15. Moving-off clutch 30 is put into a lightly engaged condition such as to transmit just the torque necessary for no-load rotary drive of infinitely variable gear-change mechanism 20. Control is performed to set the gear ratio of the infinitely variable gear-change mechanism 20 to match the current driving conditions, by control of the hydraulic pressure supplied to the drive- and driven-side hydraulic pressure cylinders 23, 26 in the infinitely variable gear-change mechanism 20 that is thus performing no-load rotary drive.

As described above, when engine E is temporarily stopped and vehicle running drive is performed by means of second motor generator 50, the forward clutch 14 and reverse brake 15 are both released, but this is performed by cancellation of the line pressure on the right hand end of forwards/reverse clutch control valve 73 through hydraulic fluid path 108a from forward/reverse clutch control solenoid valve 81. In this case, as described above, the spool of forward/reverse clutch control valve 73 is moved to the right by the spring force, so hydraulic fluid path 107 communicates with hydraulic fluid path 121 and further is connected with the shift inhibitor valve 77 through hydraulic fluid path 122. The shift control hydraulic pressure from shift control valve 66 is received at the right-hand end of the shift inhibitor valve 77 through hydraulic fluid path 110, but, in the case of the normal control range hydraulic pressure, this control hydraulic pressure is overcome by the spring force, with the result that the spool is in a rightwardly moved condition (condition shown in the drawing). Consequently, the hydraulic fluid path 122 is released to the drain through shift inhibitor valve 77. As a result, in normal operation, hydraulic fluid path 107 is released to the drain and forward clutch 14 and reverse brake 15 are both released.

In a condition in which the spool of clutch control valve 73 is thus moved to the right by the spring force, there is a problem that, if this spool gets stuck so that it cannot move or if supply of line pressure to hydraulic fluid path 108a becomes impossible as a result of electrical or mechanical malfunction of forward/reverse clutch control solenoid valve 81, or if an electrical abnormality occurs, forward clutch 14 and reverse brake 15 both stay in released condition and it becomes impossible to shift into running drive using the engine E.

With the device of this example, if such an abnormality occurs, the shift control hydraulic pressure that is supplied to hydraulic fluid path 110 is made maximum by making the current passed to shift control valve 66 zero. The maximum shift control hydraulic pressure therefore acts through hydraulic fluid path 110 on the right hand end of shift inhibitor valve 77, moving its spool to the left against the spring force, and putting the hydraulic fluid path 104b and hydraulic fluid path 122 in communication. As a result, line pressure from hydraulic fluid path 104b is supplied to hydraulic fluid path 121 from hydraulic fluid path 122 and is further supplied to forward clutch 14 or reverse brake 15 through manual valve 74 from hydraulic fluid path 107.

This control merely involves cutting off the supply of current to shift control valve 66, so this control can be performed without being affected by electrical abnormalities. Consequently, if an abnormality is detected when running drive is performed by the second motor generator 50 on temporary stoppage of engine E and release of both forward clutch 14 and reverse brake 15, a shift to drive running using the engine E can be reliably effected by engagement of forward clutch 14 or reverse brake 15 without being affected by such abnormality, by cutting off passage of current to shift control valve 66, as described above.

Also, in a condition in which the spool of forward/reverse clutch control valve 73 is moved to the right by the spring force, even if this spool gets stuck so that it cannot move or supply of line pressure to the hydraulic fluid path 108a becomes impossible due to malfunction of the forward/reverse clutch control solenoid valve 81, if the shift control hydraulic pressure that is supplied to hydraulic fluid path 110 is made a maximum by making the current that is passed to shift control valve 66 zero, line pressure will be supplied to forward clutch 14 or reverse brake 15, making it possible to shift to drive running by engine E.

It should be noted that detection of whether or not an abnormality has occurred such that running drive by the engine E has become impossible, with both the forward clutch 14 and reverse brake 15 still released, is performed by comparing the engine rotary speed and gear-change mechanism output rotary speed or vehicle speed, taking into account the gear ratio, when the gear shift lever is in a position other than P (parking) range or N (neutral) range, by ascertaining whether or not these are in rotational speed relationship when the forward clutch 14 or reverse brake 15 is connected. However, this detection is not restricted to this and could be performed by detecting the hydraulic pressure actually acting on forward clutch 14 and reverse brake 15.

Figure 6:
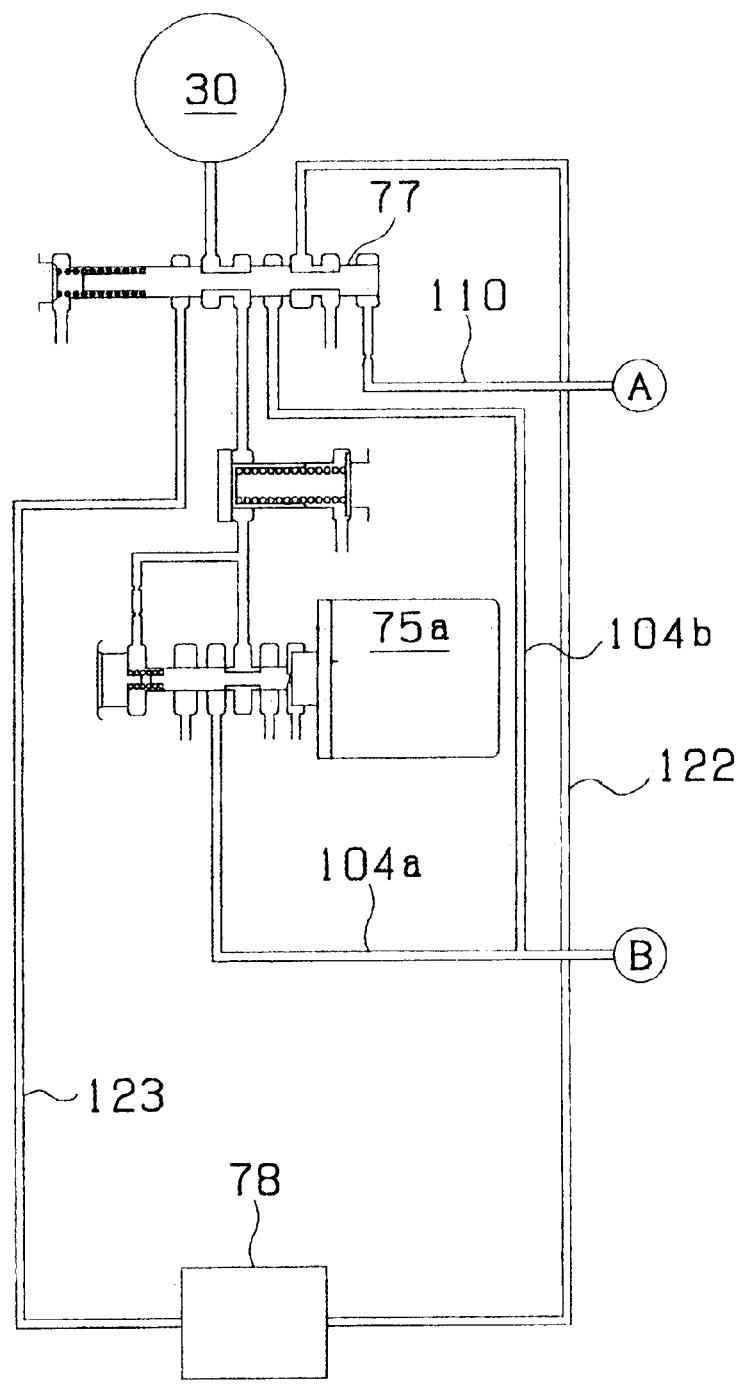
FIG. 6 to FIG. 8 are hydraulic circuit diagrams illustrating the layout of a control device according to a second embodiment of the present invention.
Figure 7:
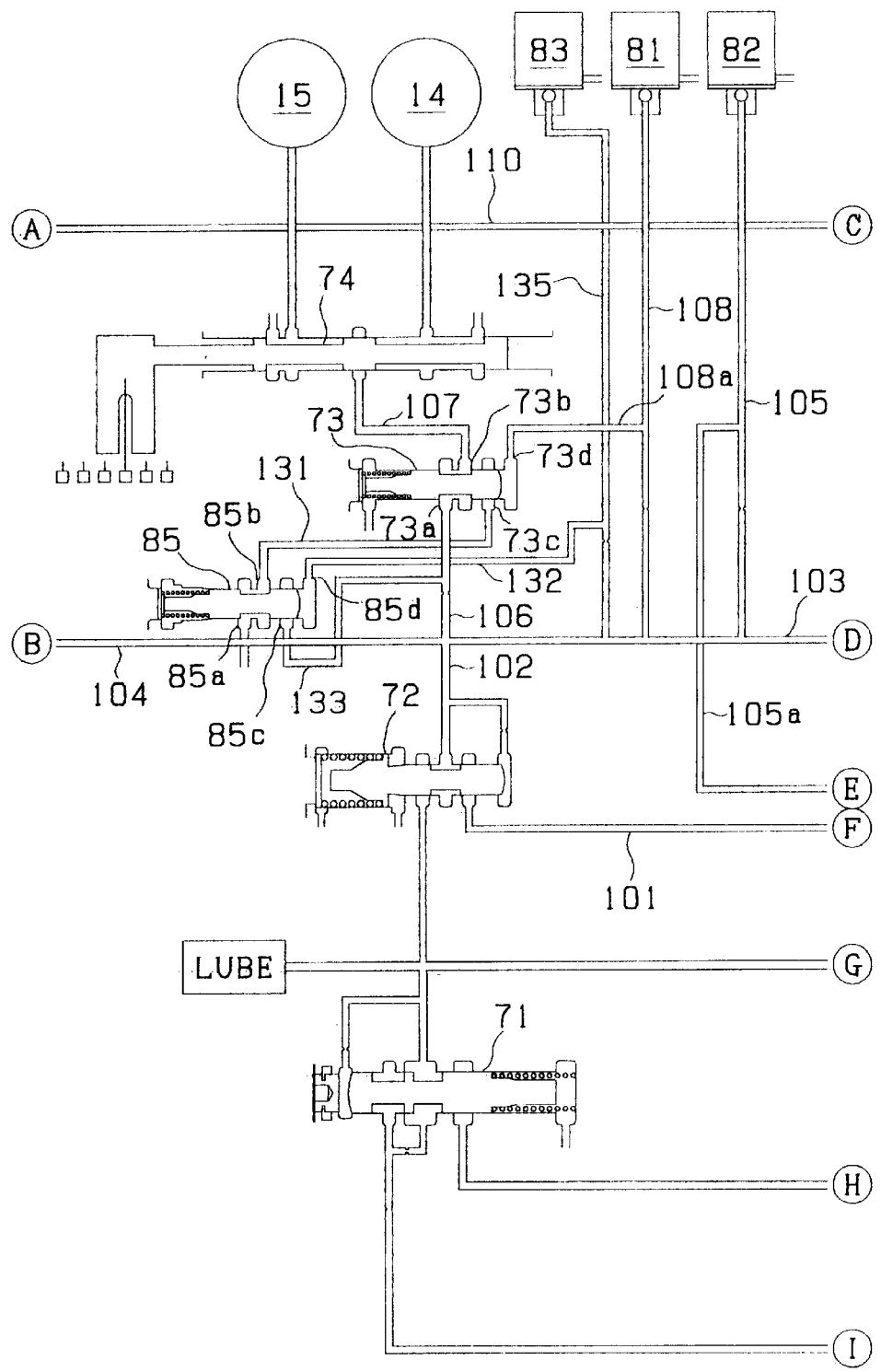
Figure 8:
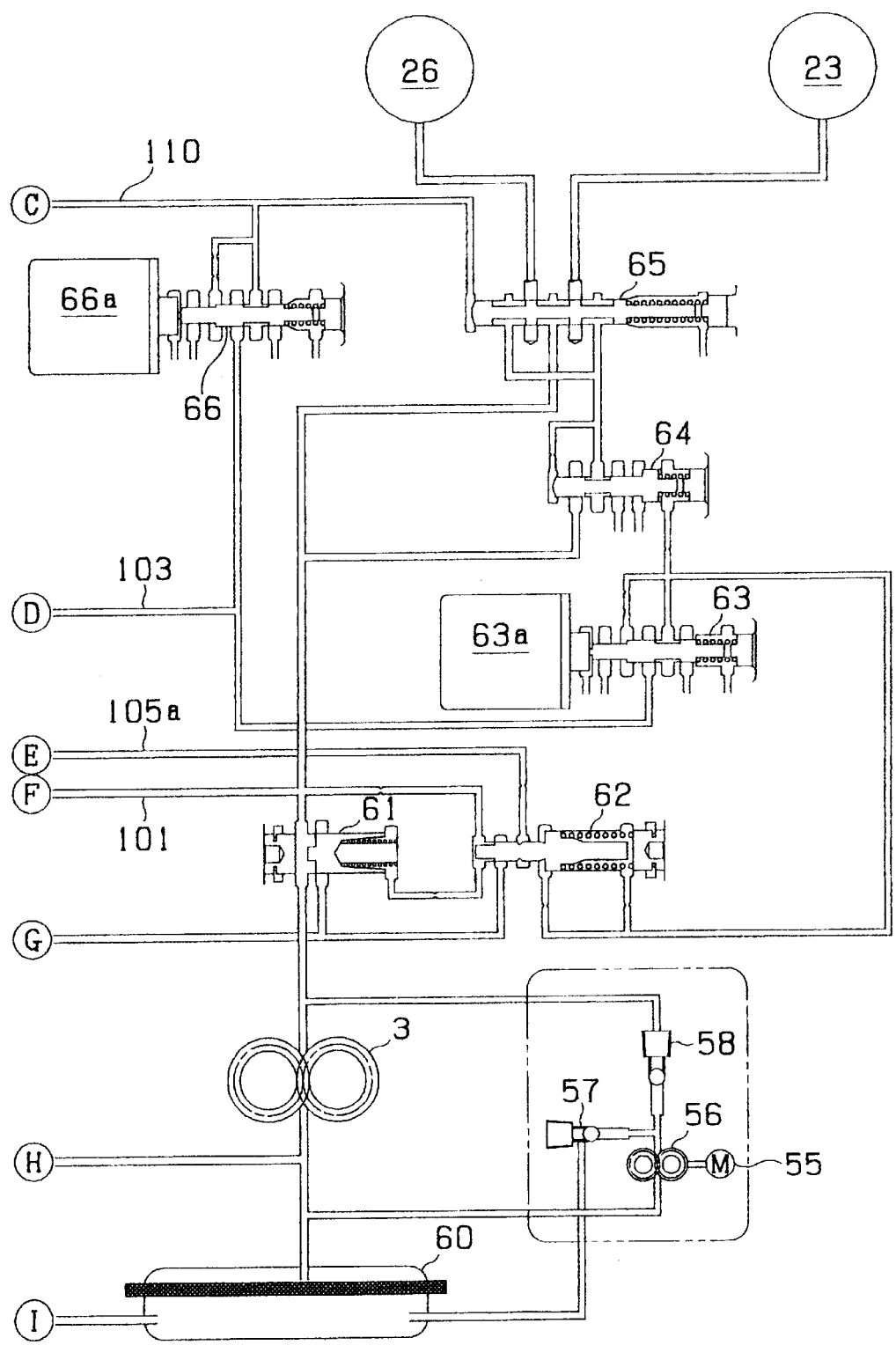

Next, a second embodiment of a control device according to the present invention will be described with reference to FIG. 6 to FIG. 8. In these Figures, the letters of the alphabet A to I enclosed by circles indicate hydraulic fluid paths that are mutually connected. This control device is similar to the control device illustrated in FIG. 2 to FIG. 4, so identical parts are given the same reference symbols and further description thereof is omitted or abbreviated. The description given below concentrates on the differences in their constructions. In this hydraulic pressure control device, the construction of the valves, etc., that perform gear-change control by adjusting the pulley widths of drive and driven pulleys 22, 25 is the same as the construction of FIG. 2 to FIG. 4, so further description thereof is omitted.

In the same way as in the foregoing example, the line pressure of hydraulic fluid path 102 is supplied to hydraulic fluid path 107 through forward/reverse clutch control valve 73 from hydraulic fluid path 106 and is further selectively supplied to forward clutch 14 and reverse brake 15 through manual valve 74. Also, as shown in the Figure, forward/reverse clutch control valve 73 has four ports 73a to 73d, the first port 73a being connected with hydraulic fluid path 106, the second port 73b being connected with hydraulic fluid path 107, the third port 73c being connected with hydraulic fluid path 131, and the fourth port 73d being connected with hydraulic fluid path 108a.

In forward/reverse clutch control valve 73, when line pressure from hydraulic fluid path 108a is received at the right hand end thereof, as shown in the Figure, the spool is shifted to the left, with the result that the first and second ports 73a, 73b are put in communication through the spool groove, allowing communication of hydraulic fluid path 106 and hydraulic fluid path 107 and simultaneously blocking the third port 73c by the spool land, causing hydraulic fluid path 131 to be cut off at this point. On the other hand, when the line pressure from hydraulic fluid path 108a disappears, the spool is moved to the right by the spring force, causing the first port 73a to be blocked by the spool land, cutting off the hydraulic fluid path 106 at this point, and allowing communication of the second and third ports 73b, 73c, causing the hydraulic fluid path 107 to be put in communication with the hydraulic fluid path 131. The action of the line pressure on the hydraulic fluid path 108a is controlled by the forward/reverse clutch control solenoid valve 81, which is connected from hydraulic fluid path 102 through hydraulic fluid path 108.

Hydraulic fluid path 131 is connected to the second port 85b of an auxiliary changeover valve 85. This auxiliary changeover valve 85 comprises a first port 85a that is released to the drain, a second port 85b that is connected to hydraulic fluid path 131 as described above, a third port 85c connected to hydraulic fluid path 133, and a fourth port 85d connected to hydraulic fluid path 132. Hydraulic fluid path 133 is connected to hydraulic fluid path 106 so that line pressure is supplied to third port 85c. Hydraulic fluid path 132 is branched from hydraulic fluid path 103 and is connected to hydraulic fluid path 135 having an auxiliary changeover control solenoid valve 83, so that control is possible whereby line pressure is made to act on the fourth port 85d by means of auxiliary changeover control solenoid valve 83.

When line pressure is supplied to fourth port 85d from hydraulic fluid path 132 by auxiliary changeover solenoid valve 83, on receipt of this line pressure, the spool of auxiliary changeover valve 85 is moved to the left. As a result, as shown in Figure, first and second ports 85a, 85b are put in communication and hydraulic fluid path 131 is connected with the drain, while third port 85c is blocked by the spool land. On the other hand, if the working hydraulic pressure of fourth port 85d is made zero by auxiliary changeover solenoid valve 83, the spool of auxiliary changeover valve 85 is moved to the right by the spring force. As a result, the first port 85a is blocked, second and third ports 85b and 85c are put in communication and hydraulic fluid path 131 and hydraulic fluid path 133 are put in communication so that line pressure from hydraulic fluid path 106 is supplied to hydraulic fluid path 131.

The action of forward/reverse clutch control valve 73 and auxiliary changeover valve 85 described above may be summarized as follows. First of all, in a condition in which the spool of forward/reverse clutch control valve 73 has been moved to the left by action of line pressure in hydraulic fluid path 108a, when the spool of auxiliary changeover valve 85 is moved to the left by action of the line pressure in hydraulic fluid path 132, the line pressure from hydraulic fluid path 106 is supplied to hydraulic fluid path 107 through forward/reverse clutch control valve 73, and is thus supplied to manual valve 74. From this condition, when the spool of forward/reverse clutch control valve 73 is moved to the right by the spring force by release of the line pressure from hydraulic fluid path 108a, hydraulic fluid path 107 is put in communication with hydraulic fluid path 131, with the result that it is released to the drain through auxiliary changeover valve 85. Further, from this condition, when the line pressure from hydraulic fluid path 132 is released and the spool of auxiliary changeover valve 85 is thereby moved to the right by the spring force, hydraulic fluid path 131 and hydraulic fluid path 133 are put in communication, allowing line pressure from hydraulic fluid path 106 to be supplied to hydraulic fluid path 107.

In ranges P and N, the changeover operation of manual valve 74 in response to operation of the gear shift lever at the driver's seat causes hydraulic fluid path 107 to be blocked and forward clutch 14 and reverse brake 15 to be both put in communication with the drain, so that forward clutch 14 and reverse brake 15 are released. In range R, hydraulic fluid path 107 and reverse brake 15 are put in communication, allowing line pressure to be supplied to reverse brake 15, making it possible for this to be engaged. Also, in the forward-side ranges, namely, ranges D, S, and L, hydraulic fluid path 107 and forward clutch 14 are put in communication, allowing line pressure to be supplied to forward clutch 14, making it possible for this to be engaged.

Operation of moving-off clutch control valve 75 that is supplied with line pressure through hydraulic fluid paths 104, 104a is controlled by linear solenoid 75a, causing moving-off clutch control hydraulic pressure to be supplied to moving-off clutch 30 through shift inhibitor valve 77 so that engagement control of moving-off clutch 30 is performed. The right hand end of shift inhibitor valve 77 is connected to shift control valve 66 through hydraulic fluid path 110. If, for example, device abnormality occurs or supply of drive electric power ceases, the current passed to linear solenoid 66a of shift control valve 66 becomes zero, causing the shift control hydraulic pressure that is supplied to hydraulic fluid path 110 to become a maximum. The control under these circumstances is the same as in the example described above, so further description of the operation is omitted.

The various control processes in a power transmission device for a hybrid vehicle constructed as above will now be described. In this power transmission device, basically, the driving force of engine E is changed in transmission ratio by means of forward/reverse changeover mechanism 10 and infinitely variable gear-change mechanism 20 and effects running drive by being transmitted from moving-off clutch 30 to the vehicle wheels through final drive and driven gears 32 and 33, differential mechanism 34, and axle shafts 35, etc. That is, vehicle running is performed by drive of engine E.

When the vehicle is stationary or in a condition in which the vehicle is running at comparatively high speed, control is effected to temporarily stop the engine E. In this case, during high-speed vehicle running, control is simultaneously exercised to continue running by driving vehicle wheels 36 by driving second motor generator 50. When this happens, generation of entrainment torque on the engine side from forward/reverse changeover mechanism 10 is prevented by releasing both forwards clutch 14 and reverse brake 15. Moving-off clutch 30 is put into a lightly engaged condition such as to transmit just the torque necessary for no-load rotary drive of infinitely variable gear-change mechanism 20; control is performed to set the gear ratio of the infinitely variable gear-change mechanism 20 to match the current driving conditions, by control of the hydraulic pressure supplied to the drive- and driven-side hydraulic pressure cylinders 23, 26 in the infinitely variable gear-change mechanism 20 that is thus performing no-load rotary drive.

Operation control of forwards clutch 14 and reverse brake 15 under such running control is described below. When vehicle running drive is performed by engine E, the spool of forward/reverse clutch control valve 73 is moved to the left by the action of line pressure in hydraulic fluid path 108a by means of forward/reverse clutch control solenoid valve 81, and the spool of auxiliary changeover valve 85 is moved to the left by action of line pressure in hydraulic fluid path 132 by means of auxiliary changeover solenoid valve 83. Line pressure from hydraulic fluid path 106 is thereby passed through forward/reverse clutch control valve 73 and is supplied through hydraulic fluid path 107 to manual valve 74, with the result that operation of forward clutch 14 and reverse brake 15 is controlled in accordance with the operation of manual valve 74.

When engine E is temporarily stopped and vehicle running drive is performed by means of second motor generator 50, the spool of forward/reverse clutch control solenoid valve 81 is shifted to the right by the spring force, due to release of the line pressure acting on hydraulic fluid path 108a by means of forwards/reverse clutch control solenoid valve 81. At this point, the spool of auxiliary changeover valve 85 stays shifted to the right by the action of line pressure on hydraulic fluid path 132 by means of auxiliary changeover solenoid valve 83. Hydraulic fluid path 107 is thereby put in communication with hydraulic fluid path 131, and is released to the drain through auxiliary changeover valve 85, with the result that both the forwards clutch 14 and reverse brake 15 are released.

In this way, control is performed whereby both forward clutch 14 and reverse brake 15 are released by rightwards movement of the spool of forward/reverse clutch control valve 73, but, in this condition in which the spool of forward/reverse clutch control valve 73 is moved to the right by the spring force, if the spool gets stuck so that it cannot move, or if, due to malfunction of the forward/reverse clutch control valve 81, it becomes impossible to supply line pressure to hydraulic fluid path 108a or if an electrical abnormality occurs, etc., forwards clutch 14 and reverse brake 15 will both stay released, making it impossible to shift to running drive by engine E in this condition.

In the device of this example, if abnormality is detected when performing running drive by second motor generator 50 by release of both forward clutch 14 and reverse brake 15 on temporary stoppage of engine E, the line pressure from hydraulic fluid path 132 is released by cutting off supply of current to auxiliary changeover solenoid valve 83, causing the spool of auxiliary changeover valve 85 to be moved to the right by the spring force. As a result, hydraulic fluid path 131 and hydraulic fluid path 133 are put in communication, allowing line pressure from hydraulic fluid path 106 to be supplied to hydraulic fluid path 131 so that line pressure is supplied to hydraulic fluid path 107 through forward/reverse clutch control valve 73 and from hydraulic fluid path 131. In this way, by cutting off supply of current to auxiliary changeover solenoid valve 83, forward clutch 14 and reverse brake 15 are engaged without being affected by any abnormality, enabling a shift to drive running by engine E to take place in a reliable fashion.

Also, in the device of this example, even when an abnormality occurs such as the spool of forward/reverse clutch control valve 73 sticking so that it cannot be moved or it becoming impossible to supply line pressure to hydraulic fluid path 108a due to malfunction of forward/reverse clutch control solenoid valve 81, control is performed whereby the spool of auxiliary changeover valve 85 is shifted to the right by spring force, by release of the line pressure from hydraulic fluid path 132 by auxiliary changeover solenoid valve 83. In this way, even if such an abnormality occurs, line pressure is supplied to forward clutch 14 or reverse brake 15 by executing operation control (control whereby current supply is cut off) of auxiliary changeover solenoid 83, thereby making it possible to perform running drive using engine E.

As will be understood from the above construction, the auxiliary changeover valve 85 corresponds to a second auxiliary changeover valve and the position in which its spool is moved to the right is the drain position while the position in which this is moved to the left is the supply position. Also, auxiliary changeover solenoid valve 83 corresponds to a second means for auxiliary operation control.

The invention being thus described, it will be obvious that there are many other variations. Such variations are not to be regarded as a departure from the spirit and scope of the invention, and all such modifications as would be obvious to one skilled in the art are intended to be included within the scope of the following claims.

What is claimed is:

1. A hybrid vehicle control device comprising:

an engine capable of temporary stoppage control in a prescribed operating condition;

a gear-change mechanism connected with an output shaft of said engine and whereby its output rotation is changed in gear ratio;

a driving force transmission system that transmits the output of said gear-change mechanism to driven wheels;

an electrically driven motor capable of driving said driven wheels and connected to said driving force transmission system; and means for engagement/disengagement arranged in a path from the output shaft of said engine to said driving force transmission system and that perform engagement/disengagement control of said path, said control device being arranged such that running drive can be performed by transmission of the output of said engine to said driven wheels through said gear-change mechanism and said power transmission system by engagement of said means for engagement/disengagement and running drive can be performed by transmission of driving force of said electrically driven motor to said driven wheels in a condition with said means for engagement/disengagement released, wherein said hybrid vehicle control device further comprises auxiliary means for engagement control that, when abnormality of said gear-change mechanism is detected, is capable of engaging said means for engagement/disengagement without being affected by said abnormality, and such that, when, in a condition with said means for engagement/disengagement released, running drive is performed by transmitting the driving force of said electrically driven motor to said driven wheels, if abnormality is detected, said means for engagement/disengagement is engaged by said auxiliary means for engagement control and running is effected by driving said engine instead of said electric motor, wherein said means for engagement/disengagement comprise hydraulic pressure type means for engagement/disengagement that perform engagement/disengagement control using hydraulic pressure force, said auxiliary means for engagement control comprise an engagement/disengagement control valve that controls hydraulic pressure supply and cut-off for engagement/disengagement control of said hydraulic means for engagement/disengagement, and auxiliary means for supplying hydraulic pressure capable of supplying hydraulic pressure for engagement/disengagement control to said means for engagement/disengagement when supply of hydraulic pressure to said means for engagement/disengagement is cut off by said engagement/disengagement control valve, and said control device being arranged such that, in a condition with supply of hydraulic pressure to said means for engagement/disengagement cut off by said engagement/disengagement control valve, supply of engagement/disengagement control hydraulic pressure to said means for engagement/disengagement can be performed by said auxiliary means for supplying hydraulic pressure, if abnormality is detected.

2. The control device according to claim 1, in which said auxiliary means for supplying hydraulic pressure comprises:

a first auxiliary changeover valve capable of changeover movement between a normal position in which normal control hydraulic pressure is supplied to the means for gear-change control of said gear-change mechanism and a fail position in which fail control pressure is supplied, and first auxiliary means for operation control that perform position changeover operation control of said first auxiliary changeover valve, said first auxiliary changeover valve being provided with a port that communicates with said means for engagement/disengagement through said engagement/disengagement control valve when said engagement/disengagement control valve is in a condition cutting off supply of hydraulic pressure to said means for engagement/disengagement, said port communicating with a drain when said first auxiliary changeover valve is in said normal position and communicating with an engagement/disengagement control hydraulic pressure supply source when it is in said fail position, control device being arranged such that, under normal conditions, said first auxiliary means for operation control positions said first auxiliary changeover valve in said normal position and, if abnormality is detected, said first auxiliary means for operation control positions said first auxiliary changeover valve in said fail position.

3. The control device according to claim 1, wherein said auxiliary means for supplying hydraulic pressure comprises:

a second auxiliary changeover valve comprising a port that communicates with said means for engagement/disengagement through said engagement/disengagement control valve when said engagement/disengagement control valve is in a condition cutting off supply of hydraulic pressure to said means for engagement/disengagement, and second auxiliary means for operation control that cause changeover movement between a drain position in which said port communicates with the drain and a supply position in which said port communicates with an engagement/disengagement control hydraulic pressure supply source, by performing operation control of said second auxiliary changeover valve;

said control device being arranged such that, under normal conditions, said second auxiliary means for operation control positions said second auxiliary changeover valve in said drain position and, if abnormality is detected, said second auxiliary means for operation control positions said second auxiliary changeover valve in said supply position.

* * * * *